US012535149B2

(12) United States Patent
Son

(10) Patent No.: US 12,535,149 B2
(45) Date of Patent: Jan. 27, 2026

(54) SEALING BLADE FOR A SLIT VALVE

(71) Applicant: SRT CO., LTD, Hwaseong-si (KR)

(72) Inventor: Yeongman Son, Hwaseong-si (KR)

(73) Assignee: SRT CO., LTD, Hwaseong-si (KR)

( * ) Notice: Subject to any disclaimer, the term of this patent is extended or adjusted under 35 U.S.C. 154(b) by 216 days.

(21) Appl. No.: 18/197,257

(22) Filed: May 15, 2023

(65) Prior Publication Data
US 2024/0003452 A1    Jan. 4, 2024

(30) Foreign Application Priority Data

Jun. 30, 2022  (KR) .................. 10-2022-0080573
Oct. 20, 2022  (KR) .................. 10-2022-0135803

(51) Int. Cl.
| | | |
|---|---|---|
| *F16K 27/02* | (2006.01) | |
| *F16K 1/36* | (2006.01) | |
| *F16K 31/12* | (2006.01) | |
| *F16K 3/02* | (2006.01) | |
| *F16K 3/18* | (2006.01) | |
| *F16K 51/02* | (2006.01) | |
| *H01L 21/67* | (2006.01) | |

(52) U.S. Cl.
CPC ............ *F16K 27/02* (2013.01); *F16K 1/36* (2013.01); *F16K 31/12* (2013.01); *F16K 3/0281* (2013.01); *F16K 3/18* (2013.01); *F16K 51/02* (2013.01); *H01L 21/67017* (2013.01)

(58) Field of Classification Search
CPC . F16K 27/02; F16K 1/36; F16K 31/12; F16K 3/0281; F16K 3/18; F16K 51/02; H01L 21/67017
See application file for complete search history.

(56) References Cited

U.S. PATENT DOCUMENTS

| | | | | |
|---|---|---|---|---|
| 5,579,718 A | * | 12/1996 | Freerks | F16K 51/02 |
| | | | | 118/733 |
| 6,347,918 B1 | * | 2/2002 | Blahnik | H01L 21/67126 |
| | | | | 414/217 |
| 6,390,449 B1 | * | 5/2002 | Ishigaki | F16K 3/184 |
| | | | | 251/193 |
| 6,685,163 B2 | * | 2/2004 | Blecha | F16K 51/02 |
| | | | | 251/328 |
| 6,932,354 B2 | * | 8/2005 | Kane | F16J 15/061 |
| | | | | 277/637 |
| 6,962,644 B2 | * | 11/2005 | Paterson | H01J 37/32458 |
| | | | | 156/345.31 |
| 7,422,653 B2 | * | 9/2008 | Blahnik | C23C 16/54 |
| | | | | 156/345.31 |
| 7,988,129 B2 | * | 8/2011 | White | H01L 21/67126 |
| | | | | 251/301 |
| 8,459,305 B2 | * | 6/2013 | Sutliff | F16K 1/2261 |
| | | | | 138/44 |
| 8,678,344 B2 | * | 3/2014 | Ehrne | F16K 3/314 |
| | | | | 251/87 |

(Continued)

*Primary Examiner* — Craig M Schneider
*Assistant Examiner* — Christopher D Ballman
(74) *Attorney, Agent, or Firm* — NSIP Law

(57) ABSTRACT

The sealing blade for a slit valve comprises: an opening/closing blade formed long in the longitudinal direction with a frontside thereof being in contact with the fluid flow path of a valve housing; a connection support coupled to the shaft of a driving member; a set of two curved balancing guides; and a set of two fastening members.

4 Claims, 7 Drawing Sheets

(56) References Cited

U.S. PATENT DOCUMENTS

| | | | | |
|---|---|---|---|---|
| 8,807,527 B2* | 8/2014 | Kim | F16K 3/188 | 137/553 |
| 8,815,616 B2* | 8/2014 | Bang | C23C 16/455 | 414/217 |
| 8,827,241 B2* | 9/2014 | Geiser | F16K 3/188 | 251/193 |
| 9,010,718 B2* | 4/2015 | Foote | E21B 33/06 | 251/1.1 |
| 9,957,745 B2* | 5/2018 | Ehrne | E05F 5/08 | |
| 10,113,651 B2* | 10/2018 | Coppola | F16K 3/0227 | |
| 10,184,291 B2* | 1/2019 | Blecha | E06B 5/10 | |
| 10,190,693 B2* | 1/2019 | White | F16K 1/465 | |
| 10,443,741 B2* | 10/2019 | Kim | F16K 31/122 | |
| 11,626,303 B2* | 4/2023 | Kalsekar | H01L 21/67772 | 118/50 |
| 11,668,401 B2* | 6/2023 | Shimoda | F16K 51/02 | 251/326 |
| 11,867,307 B1* | 1/2024 | Le | F16K 1/46 | |
| 11,881,416 B2* | 1/2024 | Chakravarthy | H01J 37/3244 | |
| 2004/0079915 A1* | 4/2004 | Contin | F16K 3/18 | 251/167 |
| 2006/0273277 A1* | 12/2006 | Heller | H01J 37/32495 | 251/334 |
| 2008/0315141 A1* | 12/2008 | Thrash | F16K 51/02 | 251/327 |
| 2009/0045371 A1* | 2/2009 | Kamibayashiyama | F16K 51/02 | 251/328 |
| 2011/0095218 A1* | 4/2011 | Schoch | F16K 51/02 | 251/157 |
| 2012/0222614 A1* | 9/2012 | Sheu | F16K 3/18 | 118/715 |
| 2016/0363240 A1* | 12/2016 | Wagner | B01D 39/08 | |
| 2017/0335456 A1* | 11/2017 | Nguyen | C23C 16/45574 | |
| 2022/0196156 A1* | 6/2022 | Shimoda | F16K 3/18 | |
| 2024/0021444 A1* | 1/2024 | Subbanna | C30B 35/005 | |

* cited by examiner

[Fig. 1]
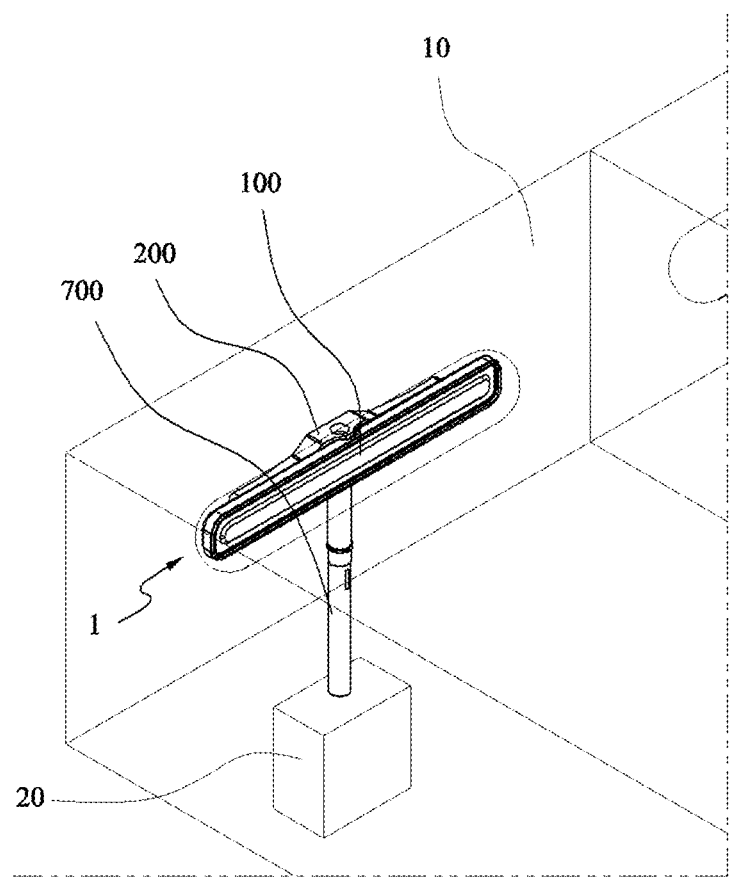

[Fig. 2]
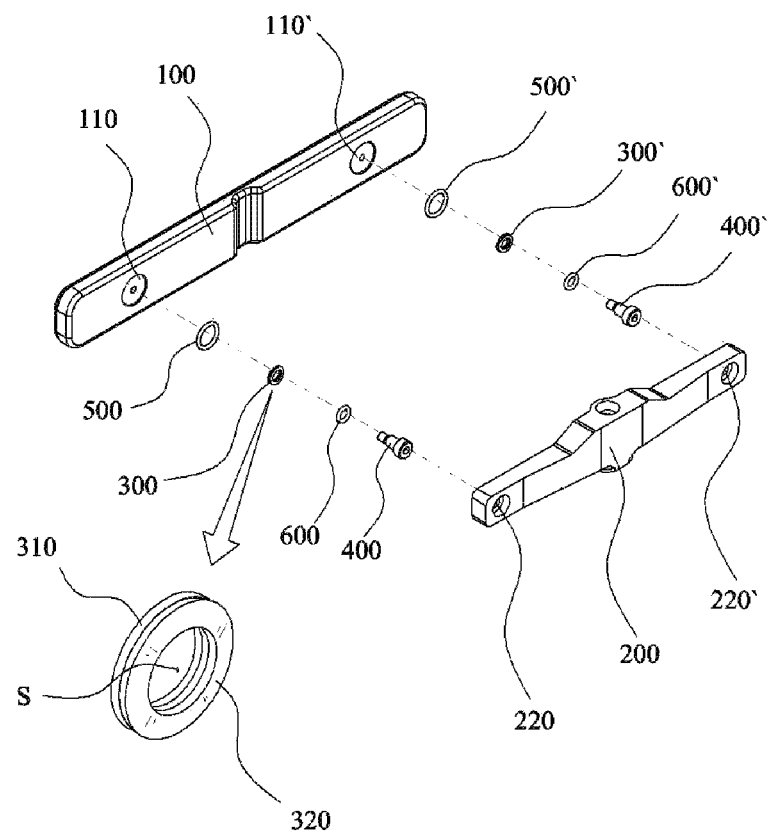

[Fig. 3]
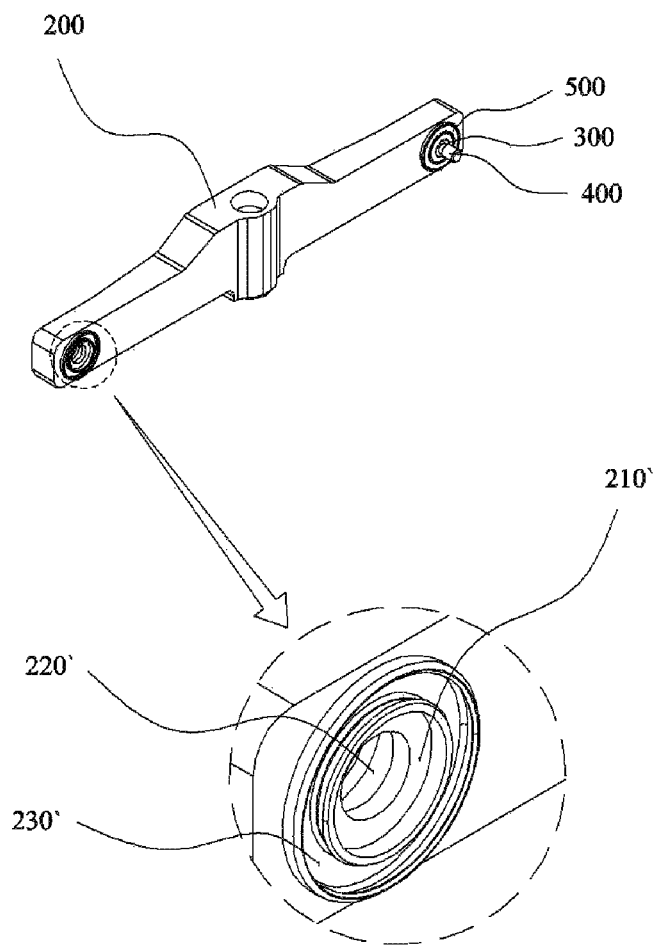

[Fig. 4]
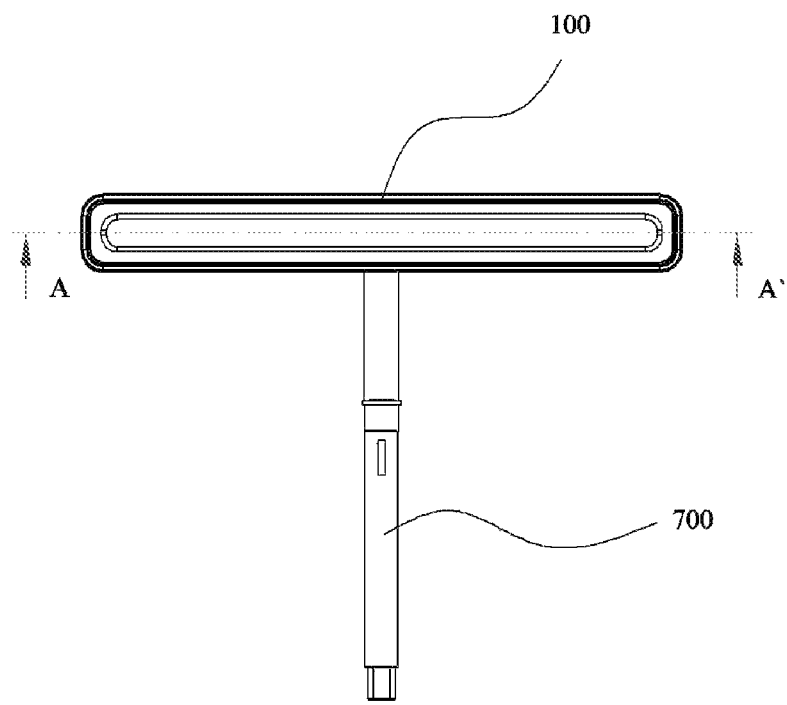

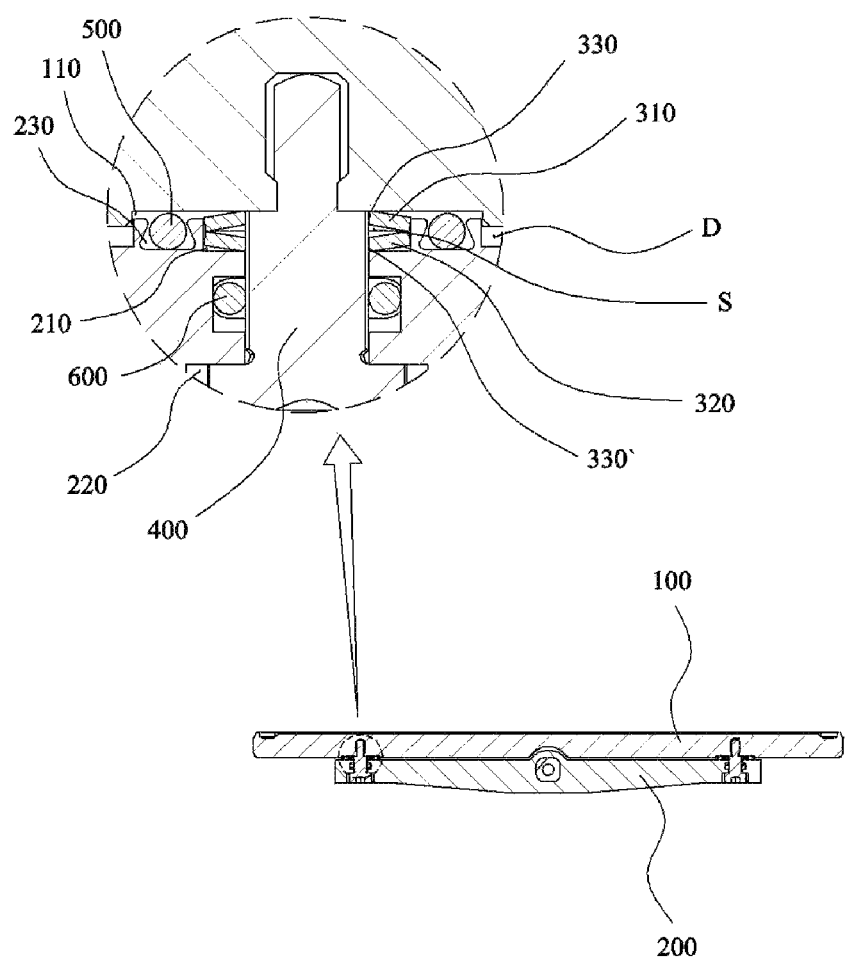
[Fig. 5]

[Fig. 6]
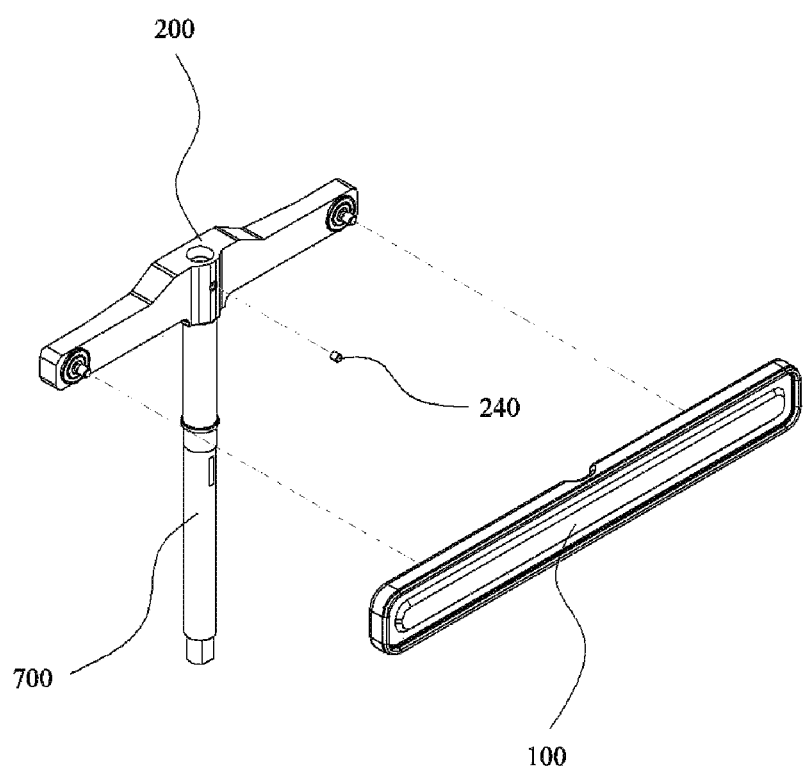

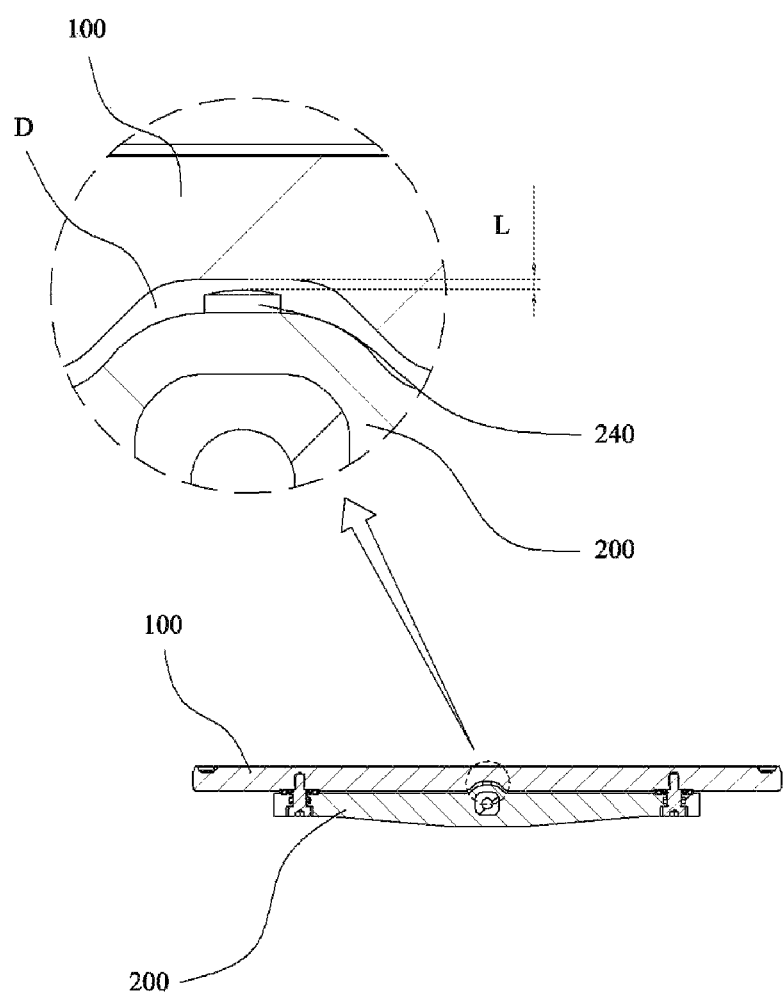
[Fig. 7]

SEALING BLADE FOR A SLIT VALVE

CROSS-REFERENCE TO RELATED APPLICATION

This application claims the benefit under 35 U.S.C. 119(a) of Korean Patent Application Nos. 10-2022-0080573 filed on Jun. 30, 2022 and 10-2022-0135803 filed on Oct. 20, 2022, in the Korean Intellectual Property Office, the entire disclosures of which are incorporated herein by reference for all purposes.

TECHNICAL FIELD

The present disclosure relates to a sealing blade for a slit valve, and more particularly to a sealing blade which maintains a tight sealing environment through uniform pressure transmission.

BACKGROUND

In general, since semiconductors require process density, high cleanliness and special manufacturing technology are required.

For this reason, semiconductor devices are manufactured in a vacuum state that can most completely block contact with foreign substances contained in the air, and sealing technology between the vacuum working area of semiconductor manufacturing equipment and atmosphere also have a great influence on the quality of semiconductor products.

Meanwhile, a slit valve opened and closed by a pneumatic actuator is installed in a process section for manufacturing semiconductors as described above.

For example, a semiconductor manufacturing apparatus includes other chambers installed adjacent to the process chamber Moreover to a process chamber in which a process is performed in a vacuum state.

That is, it consists of a process chamber in which a wafer processing process is performed, a load lock chamber for loading or unloading wafers for processing, and a transfer chamber installed between the process chamber and the load lock chamber to transfer wafers.

Meanwhile, the slit valve is mainly operated by pneumatic pressure, and is made in a form including a shaft connected to the slit valve side, a cylinder/actuator for operating the shaft, a housing for accommodating the cylinder/actuator, and the like, wherein the slit valve generally operates in a state where the pressure between the chambers is matched during the process.

These slit valves are manufactured and released in various forms, among which "the slit valve (Korean Patent Registration No. 10-1846005)" of Patent Document 1 below, comprises a plate unit including a seal plate part that seals the chamber, a middle block part that moves the seal plate part, an air line part that is detachably coupled to the upper part of the middle block part to adjust the pressure, and a vent line part that is detachably coupled to the lower part of the middle block part and seals the chamber; a housing including a gate for accommodating the plate unit and communicating with the chamber at a side; wherein a driving unit consists of a ball screw unit coupled to the motor unit and converting rotational motion of the motor unit into linear motion; a main shaft part which includes a third air line connected to the air line part of the plate unit through which air flows and a fourth air line connected to the vent line part of the plate unit through which air flows and operates together with the ball screw unit to reciprocate the plate unit up and down; and a second bellows coupled to the main shaft and coupled to the housing, and due to this there was an advantage that the operating time of the plate unit can be shortened, the vibration phenomenon can be alleviated, and the generation of particles can be reduced.

However, the "slit valve" of Patent Document 1 has a structure in which surfaces are in contact with each other to be closed when the plate unit closes the flow path of the housing, and the plate unit that moves in the horizontal direction to open and close the flow path is moved with one side that is not horizontal with respect to the flow path, depending on the amount of compressed air operated by the cylinder, the rising power of the piston, the dynamic pressure and moment applied to the plate unit, and the minute difference in the force transmission of the connection point of each component, so that when the flow path is closed a separation phenomenon occurs on the surface where the plate unit and the flow path meet, resulting in a loss of valve function due to process defects due to insufficient sealing.

SUMMARY

The present invention has been made to solve the above problems, and an object of the present invention is to provide a sealing blade for a slit valve that maintains a tight sealing environment through uniform pressure transmission when closing a fluid flow path.

In order to solve the above problems, the sealing blade for a slit valve according to the present invention is characterized in that it consists of an opening/closing blade 100 formed long in the longitudinal direction with a frontside thereof being in contact with the fluid flow path of a valve housing, and first seating grooves 110, 110' being recessed on both sides of a backside thereof; a connection support 200 coupled to the shaft 700 of a driving member 20, arranged at a predetermined interval D on the backside of the opening/closing blade 100, with second seating grooves 210, 210' being recessed at both sides of the frontside corresponding to the first seating grooves 110, 110', and through-holes 220, 220' penetrating the second seating grooves 210, 210' being respectively perforated; a set of two curved balancing guides 300, 300' arranged between the first seating grooves 110, 110' and the second seating grooves 210, 210', having the frontside contacting the inner surface of the first seating grooves 110, 110' and the backside contacting the inner surface of the second seating grooves 210, 210'; and a set of two fastening members 400, 400' connecting the opening/closing blade 100 and the connection support 200 through the through-holes 220, 220'.

Moreover, it is characterized in that the set of two curved balancing guides 300, 300' are arranged symmetrically front and back, with first and second curved plates 310, 320, 310', 320' having a dish shape with a curved surface are formed, respectively, an inner space (S) being formed between the first and second curved plates 310, 320, 310', 320', wherein the first and second passing holes 330, 330' communicating with the through-holes 220, 220' are perforated at the center of the first and second curved plates 310, 320, 310', 320', respectively.

Moreover, it is characterized in that the first curved plates 310, 310' disperse the back pressure generated in a chamber 10 to prevent bending of the opening/closing blade 100 and the second curved plates 320, 320' disperse the dynamic pressure generated from the driving member 20 to prevent bending of the connection support 200.

Moreover, it is characterized in that ring-shaped third seating grooves 230, 230' are recessed around the second seating grooves 210, 210' such that O-rings 500, 500' are inserted therein.

Moreover, it is characterized in that the support protrusion 240 protrudes in the front direction at the center of the frontside of the connection support 200, and the support protrusion 240 is spaced apart from the backside of the opening/closing blade 100 by a predetermined distance L when the slit valve is open, and the support protrusion 240 contacts the backside of the opening/closing blade 100 when the slit valve is closed.

As described above, according to the present invention, when the fluid flow path is closed, even if an unbalanced condition of force transmission in the horizontal direction occurs, the curved balancing guide provided between the opening/closing blades in contact with the fluid flow path and the connection support connected to the shaft of the driving member has the advantage of being able to maintain a tight sealed state through precise close contact by responding flexibly.

Moreover, by further forming a support protrusion in the center of the connection support such that additional pressing force is transmitted to the center of the opening/closing blade depending on the situation, the pressing force is evenly distributed throughout the opening/closing blade, thereby maintaining a more closely sealed state.

BRIEF DESCRIPTION OF THE DRAWINGS

FIG. 1 is a perspective view showing the overall appearance of a sealing blade for a slit valve according to a preferred embodiment of the present invention.

FIG. 2 is an exploded perspective view showing an exploded state of the sealing blade for a slit valve according to a preferred embodiment of the present invention.

FIG. 3 is a perspective view showing the state of the connection support of the configuration of a sealing blade for a slit valve according to a preferred embodiment of the present invention.

FIG. 4 is a front view showing the front view of a sealing blade for a slit valve according to a preferred embodiment of the present invention.

FIG. 5 is a cross-sectional view taken along A-A' of FIG. 4.

FIG. 6 is an exploded perspective view showing an exploded state of a sealing blade for a slit valve according to another preferred embodiment of the present invention.

FIG. 7 is an enlarged cross-sectional view of a support protrusion of the configuration of a sealing blade for a slit valve according to another preferred embodiment of the present invention.

DETAILED DESCRIPTION

In the following, the sealing blade 1 for a slit valve according to an embodiment of the present invention will be described in detail with reference to the accompanying drawings. First, it should be noted that among the drawings, the same components or parts are indicated by the same reference numerals as much as possible. In describing the present invention, detailed descriptions of related well-known functions or configurations are omitted in order not to obscure the gist of the present invention.

Referring to FIG. 1, 2 or 3, the sealing blade 1 for slit valves according to an embodiment of the present invention largely includes an opening/closing blade 100, a connection support 200, a set of two curved balancing guides 300, 300' and a set of two fastening members 400, 400'.

First, the opening/closing blade 100 will be described. As shown in FIG. 1, 2 or 4, the opening/closing blade 100 is a component that is arranged inside the valve housing and moves vertically and horizontally by the driving force of the driving member 20 to open and close the fluid flow path formed in the valve housing with a sealing ring made of an elastic material being provided for tight sealing when the fluid flow path is closed.

Meanwhile, on both sides of the backside of the opening/closing blade 100, first seating grooves 110, 110' are symmetrically recessed.

The first seating grooves 110 and 110', in a state where the opening/closing blade 100 and the connection support 200 are connected, are positioned facing second seating grooves 210, 210' and third seating grooves 230, 230' to be described later, and in particular, by constraining the position of the curved balancing guide provided between the first seating grooves 110, 110' and the second seating grooves 210, 210' together with the second seating grooves 210, 210', it is possible to position the curved balancing guide 300, 300' within the corresponding range.

Next, the connection support 200 will be described. As shown in FIG. 1, 2 or 3, the connection support 200 is a component that is coupled to the shaft 700 of the driving member 20 and is coupled to the shaft 700 of the driving member 20 (at this time, it is preferable that the connection support 200 and the shaft 700 are coupled in a rigid structure), and is disposed on the backside of the opening/closing blade 100 at a predetermined interval D to transmit the driving force of the driving member 20 to the opening/closing blade 100, including the seating grooves 210, 210', through-holes 220, 220', and the third seating grooves 230, 230'.

The second seating grooves 210, 210' are components that are symmetrically recessed on both sides of the frontside of the connection support 200, and are formed at positions corresponding to the first seating grooves 110, 110' to serve to constrain the position of the set of two curved balancing guides 300, 300' together with the first seating grooves 110 and 110'.

The through-holes 220, 220' are a kind of hole penetrating the center of the second seating grooves 210, 210', and the set of two fastening members 400, 400' to be described later coupled to the connection support 200 through the through-holes 220, 220' are coupled to the opening/closing blade 100, enabling the opening/closing blade 100 and the connection support 200 to be connected.

The third seating grooves 230, 230' are components that is formed in a ring shape around the second seating groove and into which O-rings 500, 500' are inserted.

At this time, the O-rings 500, 500' serves to prevent inflow of process gas, particles, etc. into the space where the set of two curved balancing guides 300, 300' are arranged when the opening/closing blade 100 closes the fluid flow path.

Meanwhile, in another embodiment of the present invention, as shown in FIG. 6 or 7, a support protrusion 240 is formed protruding in the front direction at the center of the frontside of the connection support 200.

At this time, the support protrusion 240 is spaced apart from the backside of the opening/closing blade 100 by a predetermined distance L in the OPEN state of the slit valve, and the support protrusion 240 comes into contact with the backside of the opening/closing blade 100 in the CLOSE state of the slit valve, and, for the structure of the present invention, Moreover to the pressing force transmitted to both sides of the opening/closing blade 100, the pressing force is additionally transmitted to the center of the opening/closing blade 100, such that the pressing force is evenly distributed over the entire opening/closing blade 100 to more closely seal the fluid flow path.

Meanwhile, it is preferable that the distance between the front end of the support protrusion 240 and the backside of the opening/closing blade 100 is 0.6 mm to 1.0 mm.

When set to 0.6 mm or less, pressing force outside the design range is transmitted to the central side of the opening/closing blade 100, which may cause a leaning phenomenon or a bending phenomenon, and a lifting phenomenon may occur on both sides of the opening/closing blade 100, thereby significantly reducing the sealing force.

Moreover, when set to 1.0 mm or more, contact between the support protrusion 240 and the opening/closing blade 100 is not made by design, such that the pressing force is not transmitted.

Next, the set of two curved balancing guides 300, 300' will be described. As shown in FIG. 2, 3 or 5, the set of two curved balancing guides 300, 300' are arranged between the first seating grooves 110, 110' and the second seating grooves 210, 210', and the frontside is in contact with the inner surface of the first seating grooves 110, 110' and the backside is in contact with the inner surface of the second seating grooves 210, 210, such that when the opening/closing blade 100 moves horizontally, the pressing force transmitted from the driving member 20—the connection support 200 is uniformly transmitted to the opening/closing blade 100, and is formed of first curved plates 310, 310' and second curved plates 320, 320'.

The first curved plates 310, 310' is a dish-shaped component having a curved frontside, and is in contact with the inner surface of the first seating groove 110, 110' to serve to prevent bending of the opening/closing blade 100 by dispersing back pressure generated in the chamber, and uniformly transmits the pressing force to the opening/closing blade 100 side.

The second curved plates 320, 320' is a dish-shaped component having a curved backside in a state arranged on the rear side of the first curved plates 310, 310', and is in contact with the inner surface of the second seating groove 210, 210' to serve to prevent bending of the connection support 200 by distributing the dynamic pressure generated from the connection support 200, and uniformly transmits the pressing force to the first curved plate side 310, 310'.

That is, it is configured that the first curved plates 310, 310' or the second curved plates 320, 320', due to the curved surface, can come into contact with the inner surface of the first seating groove 110 or 110' or the inner surface of the second seating groove 210 or 210' depending on the operating position of the pressing force, such that even if the pressing force transmitted from the driving member 20—the connection support 200 acts in any one direction from the center of the first curved plates 310, 310' or the second curved plates 320, 320', up, down, left, right, or diagonally, the first curved plates 310, 310' or the second curved plates 320, 320' moves minutely to distribute the pressing force across the surface in a balanced manner, when the opening/closing blade 100 moves in the horizontal direction, thereby accurately and uniformly pressurizing the entire edge of the fluid flow path to enable a tight and reliable seal to be achieved.

Meanwhile, the first curved plates 310, 310' or the second curved plates 320, 320' are preferably made of a material capable of elastic deformation in order to respond to back pressure or dynamic pressure, and an inner space S is formed between the first and second curved plates 310, 320, 310', 320', such that smooth deformation or movement is possible when deformation or fine movement occurs.

Meanwhile, in the center of the first and second curved plates 310, 320, 310', 320', first and second passing holes 330, 330' communicating with the through-holes 220, 220' are perforated, respectively, enabling the set of two fastening members 400, 400' to pass through and fasten to the opening/closing blade 100.

Next, the set of two fastening members 400, 400' will be described. As shown in FIG. 2, the set of two fastening members 400, 400' are components connecting the opening/closing blade 100 and the connection support 200, and through the connection support 200, pass through the through-holes 220, 220' and the first and second passing holes 330, 330', fastened to the opening/closing blade 100. At this time, it is preferable that the set of two fastening members 400, 400' consist of stripper bolts.

Optimal embodiments have been disclosed in the drawings and specification. Although specific terms have been used herein, they are only used for the purpose of describing the present invention and are not used to limit the scope of the present invention described in the claims or defining the meaning. Therefore, those skilled in the art will understand that various modifications and equivalent other embodiments are possible therefrom. Therefore, the true technical protection scope of the present invention should be determined by the technical spirit of the appended claims.

DESCRIPTION OF SYMBOLS

1: Sealing blade for a slit valve
100: Opening/closing blade
110, 110': First seating grooves
200: Connection support
210, 210': Second seating grooves
220, 220': Through-holes
230, 230': Third seating grooves
240: Support protrusion
300, 300': Curved balancing guides
310, 310': First curved plates
320, 320': Second curved plates
330: First passing hole 330' Second passing hole
400, 400': Fastening members
500, 500': O-ring

The invention claimed is:

1. A sealing blade for a slit valve, comprising:
an opening/closing blade (100) formed long in a longitudinal direction with a frontside thereof being in contact with a fluid flow path of a valve housing, and comprising first seating grooves (110, 110') being recessed on a backside thereof;
a connection support (200) coupled to a shaft (700) of a driving member (20), arranged at a predetermined interval (D) on the backside of the opening/closing blade (100), comprising second seating grooves (210, 210') being recessed on a frontside thereof corresponding to the first seating grooves (110, 110'), and through-holes (220, 220') penetrating the second seating grooves (210, 210');
curved balancing guides (300, 300') arranged between the first seating grooves (110, 110') and the second seating grooves (210, 210'), having front surfaces thereof contacting the first seating grooves (110, 110') and back surfaces thereof contacting the second seating grooves (210, 210'); and fastening members (400, 400') connecting the opening/closing blade 100 and the connection support 200 through the through-holes (220, 220'),
wherein each of the curved balancing guides (300, 300') comprises a front ring-shaped plate (310, 310') and a back ring-shaped plate (320, 320') each having curved surfaces, respectively, such that each of the curved balancing guides (300, 300') comprises an inner space (S) between the front ring-shaped plate (310, 310') and the back ring-shaped plate (320, 320'), and
wherein the curved balancing guides (300, 300') comprise passing holes (330, 330') at a center of each of the curved balancing guides (300, 300'), such that the passing holes (330, 330') communicate with the through-holes (220, 220'), respectively.

2. The sealing blade according to claim 1, wherein the front ring-shaped plate (310, 310') disperse back pressure generated in a chamber (10) to prevent bending of the opening/closing blade (100) and the back ring-shaped plate (320, 320') disperse dynamic pressure generated from the driving member (2) to prevent bending of the connection support (200).

3. The sealing blade according to claim 1, wherein ring-shaped third seating grooves (230, 230') are recessed around the second seating grooves (210, 210') such that O-rings (500, 500') are inserted therein.

4. The sealing blade according to claim 1, wherein a support protrusion (240) protrudes from a center of the frontside of the connection support (200), wherein the support protrusion (240) is spaced apart from the backside of the opening and closing blade (100) by a predetermined distance (L) when the slit valve is open, and the support protrusion (240) contacts the backside of the opening/closing blade (100) when the slit valve is closed.

* * * * *